(12) United States Patent
Stadelmeier et al.

(10) Patent No.: US 8,982,985 B2
(45) Date of Patent: Mar. 17, 2015

(54) PILOT ALLOCATION IN MULTI-CARRIER SYSTEMS WITH FREQUENCY NOTCHING

(71) Applicant: Sony Corporation, Tokyo (JP)

(72) Inventors: Lothar Stadelmeier, Stuttgart (DE); Andreas Schwager, Waiblingen (DE)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 13/676,952

(22) Filed: Nov. 14, 2012

(65) Prior Publication Data

US 2013/0070713 A1    Mar. 21, 2013

Related U.S. Application Data

(63) Continuation of application No. 12/436,526, filed on May 6, 2009, now Pat. No. 8,363,740.

(30) Foreign Application Priority Data

May 29, 2008  (EP) ..................................... 08157225
May 29, 2008  (EP) ..................................... 08157226

(51) Int. Cl.
*H04L 27/28*    (2006.01)
*H04L 5/00*    (2006.01)

(52) U.S. Cl.
CPC ............ *H04L 5/0048* (2013.01); *H04L 5/0007* (2013.01); *H04L 5/0058* (2013.01)
USPC ............ 375/295; 375/260; 375/316; 375/219

(58) Field of Classification Search
CPC ... H04L 5/0048; H04L 5/0023; H04L 5/0007; H04L 25/0204; H04L 7/0413; H04L 7/0684; H04L 5/0058
USPC ........................... 375/260, 259, 295, 316, 219
See application file for complete search history.

(56) References Cited

U.S. PATENT DOCUMENTS 6,947,530 B1    9/2005 Barsoum
7,778,337 B2    8/2010 Tong et al.
(Continued)

FOREIGN PATENT DOCUMENTS

JP        9-18433 A    1/1997
JP    2005-109743 A    4/2005
(Continued)

OTHER PUBLICATIONS

Stefan H. Müller-Weinfurtner, "OFDM for Wireless Communications: Nyquist Windowing, Peak-Power Reduction, and Synchronization", 2000, ISBN 3-8265-7658-6, 117 pages.
(Continued)

*Primary Examiner* — Kenneth Lam
(74) *Attorney, Agent, or Firm* — Oblon, McClelland, Maier & Neustadt, L.L.P.

(57) ABSTRACT

A transmitting apparatus is provided for transmitting signals in a multi carrier system, in which pilot signals and data mapped on frequency carriers are transmitted in a transmission bandwidth, wherein a part of the transmission bandwidth is not used to transmit signals. The apparatus includes a pilot signal mapper for mapping pilot signals onto selected frequency carriers according to a pilot pattern that is adapted for a channel estimation in a corresponding receiving apparatus, the pilot pattern enabling a channel estimation for frequency carriers next to the part of the transmission bandwidth that is not used to transmit signals.

21 Claims, 5 Drawing Sheets

(56) References Cited

U.S. PATENT DOCUMENTS

| | | | |
|---|---|---|---|
| 8,121,017 B2 | 2/2012 | Stadelmeier et al. | |
| 8,274,878 B2 | 9/2012 | Stadelmeier et al. | |
| 8,363,740 B2 * | 1/2013 | Stadelmeier et al. | 375/260 |
| 2005/0243939 A1 | 11/2005 | Jung et al. | |
| 2006/0198455 A1 * | 9/2006 | Fujii et al. | 375/260 |
| 2006/0250943 A1 | 11/2006 | Mujtaba et al. | |
| 2007/0071125 A1 | 3/2007 | Tan et al. | |
| 2007/0082692 A1 | 4/2007 | Tirkkonen et al. | |
| 2008/0068980 A1 * | 3/2008 | Lim et al. | 370/208 |
| 2008/0117999 A1 * | 5/2008 | Kadous et al. | 375/267 |
| 2008/0310457 A1 * | 12/2008 | Yamashita et al. | 370/491 |
| 2008/0310530 A1 * | 12/2008 | Imamura et al. | 375/260 |
| 2009/0059885 A1 | 3/2009 | Sadek et al. | |
| 2009/0213723 A1 * | 8/2009 | Noh et al. | 370/208 |
| 2009/0285173 A1 * | 11/2009 | Koorapaty et al. | 370/330 |
| 2011/0116516 A1 * | 5/2011 | Hwang et al. | 370/480 |
| 2012/0213255 A1 | 8/2012 | Stadelmeier et al. | |
| 2012/0236880 A1 | 9/2012 | Stadelmeier et al. | |
| 2012/0269201 A1 | 10/2012 | Atungsiri et al. | |

FOREIGN PATENT DOCUMENTS

| | | |
|---|---|---|
| JP | 2008-5324 | 1/2008 |
| JP | 2008-512963 A | 4/2008 |
| WO | WO 2006/025513 A1 | 3/2006 |

OTHER PUBLICATIONS

Digital Video Broadcasting (DVB); "Second Generation Framing Structure, Channel Coding and Modulation Systems for Broadcasting, Interactive Services, News Gathering and Other Broadband Satellite Applications (DVB-S2)", ETSI EN 302 307 (V1.2.1), European Standard (Telecommunications Series), Aug. 2009, 78 pages.

Digital Video Broadcasting (DVB); "Frame Structure Channel Coding and Modulation for a Second Generation Digital Terrestrial Television Broadcasting System (DVB-T2)", ETSI EN 302 755 (V1.1.1), European Standard (Telecommunications Series), Sep. 2009, 167 pages.

Digital Video Broadcasting (DVB); "Framing Structure, Channel Coding and Modulation for Digital Terrestrial Television", ETSI EN 300 744 (V1.5.1), European Standard (Telecommunications Series), Nov. 2004, 64 pages.

"Data Over Cable Service Interface Specifications DOCSIS 3.0", Physical Layer Specification CM-SP-PHYv3.0-108-090121, Jan. 21, 2009, 169 pages.

"Transmission System for Digital Terrestrial Television Broadcasting", ARIB Standard, ARIB STD-B31 Version 1.6, Association of Radio Industries and Businesses, Nov. 30, 2005, 172 pages.

Michael Speth, et al., "Optimum Receiver Design for OFDM-Based Broadband Transmission—Part II: A Case Study", IEEE Transactions on Communications, vol. 49, No. 4, Apr. 2001, pp. 571-578.

D. Bueche, et al., "Pilot Symbol Assisted Modulation for Powerline Communications", Industrial Electronics, vol. 1, XP010874407, May 4, 2004, pp. 717-720.

Andreas Schwager, et al., Potential of Broadband Power Line Home Networking, Consumer Communications and Networking Conference, XP010787664, Jan. 3, 2005, pp. 359-363.

Office Action issued May 28, 2013, in Japanese Patent Application No. 2009-130877.

Office Action issued Feb. 7, 2013 in Australian Application No. 2009201967.

* cited by examiner

Fig. 7 — Shortened training symbols; data symbols

PILOT ALLOCATION IN MULTI-CARRIER SYSTEMS WITH FREQUENCY NOTCHING

CROSS-REFERENCE TO RELATED APPLICATIONS

The present application is a continuation application of U.S. application Ser. No. 12/436,526 filed May 6, 2009, the entire contents of which are incorporated herein by reference, and claims priority of European Application Nos. 08157226.5, filed May 29, 2008, and 08157225.7 filed May 29, 2008.

The present invention relates to an improved pilot signal allocation scheme in a multi-carrier system, in which a part of the transmission bandwidth is not used to transmit signals.

In the modern communication world, different kinds of communication systems often share the same frequency range or use overlapping frequency ranges while operating in the same or neighbouring areas. For example, terrestrial services and cable based communication systems often use similar frequency ranges. Hereby, radiation from the cable network, for example from unshielded parts of cable outlets and/or connections to TV sets may disturb the operation of the terrestrial services. On the other hand, the transmission quality of the cable services may be negatively influenced by the terrestrial services causing additional noise in the cable medium. Particularly in situations where the terrestrial services are security relevant (emergency services, airport control and the like), it is necessary to take corresponding counter measures in the cable communication system. In order to avoid such frequency range conflicts, a notching of frequencies is often used in order to avoid negative effects in one or both of the communication systems or services.

Figure 1:
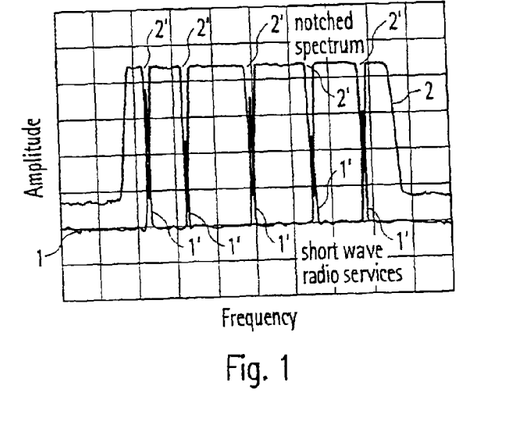
FIG. 1 shows a frequency/amplitude diagram of a wideband frequency spectrum which is notched due to several small band services.

FIG. 1 shows a frequency/amplitude diagram with an example of a spectrum 1 of a terrestrial wireless short wave radio service transmitting signals in five relatively narrow frequency bands 1', as well as a spectrum 2 which is notched at the narrow frequency bands 2' in which the terrestrial services are transmitting. Non-limiting examples for such terrestrial services are radio amateur transmissions, short wave radio services, security related radio transmissions, for example flight security, and many more. Non-limiting examples for transmission or communication systems which are or need to be notched are cable broadcast transmissions, powerline communication systems, xDSL systems and many more.

It is to be understood, however, that the concept of notching can be generally used in any wireless or wired transmission or communication system which overlaps with the frequency range of any other wireless or wired transmission or communication system which operates in a smaller bandwidth. It has also to be understood that the concept of notching small frequency ranges within a wider frequency range can be applied and used in unicast, multicast and broadcast transmission systems alike, as well as in any kind of wired or wireless communication system. In order to maximize the transmission or communication capacity, the width of the frequency notches should be as small as possible, which means that only the frequencies which really overlap with the frequency that should be omitted and not used.

The notching of frequencies, particularly in situations where the necessary notch width varies sometimes or regularly, has, however, negative impacts on the channel estimation, since important parts, such as pilot signals, necessary for the channel estimation in the frequency areas (frequency carriers) adjacent to the notched frequencies are lost.

The present invention therefore has the object to enable a more reliable channel estimation in multi-carrier systems, in which pilot symbols are used for the channel estimation and in which a part of the frequency bandwidth is not used to transmit signals.

The above object is achieved by a transmitting apparatus, a transmitting method and a pilot pattern.

According to the present invention, a transmitting apparatus for transmitting signals in a multi-carrier system, in which pilot signals and data mapped on frequency carriers transmitted in a transmission bandwidth, wherein a part of said transmission bandwidth is not used to transmit signals, comprises pilot signal mapping means for mapping pilot signals onto selected frequency carriers according to a pilot pattern which is adapted for a channel estimation, said pilot pattern enabling a channel estimation for frequency carriers next to said part of said transmission bandwidth which is not used to transmit signals.

According to the present invention, a transmitting method for transmitting signals in a multi-carrier system, in which pilot signals and data mapped on frequency carriers are transmitted in a transmission bandwidth, wherein a part of said transmission bandwidth is not used to transmit signals, comprises the steps of mapping pilot signals onto selected frequency carriers according to a pilot pattern which is adapted for a channel estimation on a receiving side, said pilot pattern enabling a channel estimation for frequency carriers next to said part of said transmission bandwidth which is not used to transmit signals.

The present invention is further directed to a pilot pattern for a multi-carrier system, in which pilot signals and data mapped on frequency carriers are transmitted in a transmission bandwidth, wherein a part of said transmission bandwidth is not used to transmit signals, said pilot pattern comprising pilot signals mapped onto selected frequency carriers according so that a channel estimation for frequency carriers next to said part of said transmission bandwidth which is not used to transmit signals is possible.

The above object is further achieved by a receiving apparatus, a receiving method, a system and a further method.

According to the present invention, a receiving apparatus for receiving signals in a multi-carrier system, in which pilot signals and data mapped on frequency carriers transmitted in a transmission bandwidth, wherein a part of said transmission bandwidth is not used to transmit signals, comprises channel estimation means for performing a channel estimation for received signals on the basis of pilot signals arranged in a pilot pattern, said pilot pattern enabling a channel estimation for frequency carriers next to said part of said transmission bandwidth which is not used to transmit signals.

According to the present invention, a receiving method for receiving signals in a multi-carrier system, in which pilot signals and data mapped on frequency carriers transmitted in a transmission bandwidth, wherein a part of said transmission bandwidth is not used to transmit signals, comprises the step of performing a channel estimation for received signals on the basis of pilot signals arranged in a pilot pattern, said pilot pattern enabling a channel estimation for frequency carriers next to said part of said transmission bandwidth which is not used to transmit signals.

The present invention is further directed to a system comprising a transmitting apparatus for transmitting signals in a multi carrier system, in which pilot signals and data mapped on frequency carriers are transmitted in a transmission bandwidth, wherein a part of said transmission bandwidth is not used to transmit signals, comprising pilot signal mapping means for mapping pilot signals onto selected frequency carriers according to a pilot pattern which is adapted for a channel estimation in a corresponding receiving apparatus, said pilot pattern enabling a channel estimation for frequency carriers next to said part of said transmission bandwidth which is not used to transmit signals, said system further comprising a receiving apparatus according to the present invention adapted to receive signals transmitted from said transmitting apparatus.

The present invention is further directed to a method for transmitting and receiving signals in a multi carrier system, in which pilot signals and data mapped on frequency carriers are transmitted in a transmission bandwidth, wherein a part of said transmission bandwidth is not used to transmit signals, comprising the steps of mapping pilot signals onto selected frequency carriers according to a pilot pattern which is adapted for a channel estimation on a receiving side, said pilot pattern enabling a channel estimation for frequency carriers next to said part of said transmission bandwidth, transmitting said signals, and receiving said signals according to the receiving method of the present invention.

In order to enable a more reliable channel estimation (or a channel estimation with increased reliability) on a receiving side, e.g. a receiving apparatus, in multi-carrier systems, in which a part (or several parts) of the transmission bandwidth is not used to transmit signals, i.e. in which one or more parts of the frequency bandwidth are notched, the present invention suggests to use a frequency (and eventually time) distribution of pilot signals, i.e. a pilot pattern that enables a channel estimation particularly for the frequency carriers in the areas or regions next or adjacent to the part of the transmission bandwidth which is not used to transmit signals. Thus, the present invention hereby suggests to use a pilot pattern in which no frequency carriers with pilot signals are present in the part of said transmission band which is not used to transmit signals. Hereby, all pilot signals necessary for a more reliable channel estimation can be received and processed at the receiving side.

The present invention can generally be applied to any wireless or wired unidirectional (point-to-point), multidirectional or broadcast transmission system, communication system or transmission link in which multiple frequency carriers are used to transmit data, pilot signals and other necessary information. An non-limiting example for such a system is an orthogonal frequency division multiplexing (OFDM) system, but the present invention can be applied in any system in which the transmission or communication (frequency) bandwidth is split in individual frequency carriers, onto which data, pilot signals (and other necessary information) are mapped or modulated. Hereby, the frequency carriers may be equidistant and all have the same length (bandwidth), such as in an OFDM system, or they may be not equidistant and/or not have all the same bandwidth.

Hereby, the present invention can be applied to systems in which pilot signals are mapped onto frequency carriers among the data carrying frequency carriers (a non-limiting example of such a system would be a classical OFDM broadcasting system, such as a digital video broadcast system in which only pilot carriers embedded in the data carriers are used for channel estimation on the receiving side) or to systems in which a preamble with pilot signals is used for synchronization and channel estimation on a receiving side and in which the data carriers are transmitted in separate data symbols (an example for such a system would be a typical bi-directional communication system like powerline communication systems, or newer broadcast standards which use a preamble with pilot signals to define the start of a new data symbol frame). A possible application (among others) would be a next generation or future cable-based digital video broadcast system. However, the present invention is not limited to these examples but can be applied to other systems, such as systems which use a mixture of preambles with pilot signals and data symbols with embedded pilot signals.

In a multi-carrier system in which frequency carriers with pilot signals are embedded within frequency carriers with data, i.e. data and pilot signals are mixed, the present invention suggests to use (and to perform a channel estimation on the basis of) a pilot pattern with additional pilot signals on frequency carriers adjacent said part of said transmission bandwidth which is not used to transmit signals. In other words, the original distribution of and allocation of pilot signals, i.e. the pilot pattern, outside of the frequency notch remains unchanged, except that additional pilot signals are mapped onto some or all frequency carriers adjacent to the part of the transmission bandwidth which is not used to transmit signals. The term adjacent to, hereby means throughout this specification that the additional pilot signals should be added to carriers between the notched frequency part and the next carriers of the original (unchanged) pilot pattern. For example, the additional pilot signal could be added only to carriers immediately adjacent to or bordering the frequency notch, but also additionally or alternatively to other carriers close to but not immediately adjacent the notch.

These additional pilot signals can then be used at the receiving side for the channel estimation of frequency carriers in the areas adjacent to the part of the transmission bandwidth which is not used to transmit signals. Hereby, in case that the pilot pattern has a distribution of pilot signals in the time dimension, the additional pilot signals could be mapped on frequency carriers adjacent to said part of said transmission bandwidth which is not used to transmit signals with a time distribution which corresponds to the time distribution of the original pilot pattern and the channel estimation can be performed on the basis of such a pilot pattern. The time distribution could be regular or not regular. In other words, in a system in which the frequency carriers are additionally allocated to time slots, such as in an OFDM system, it might not be necessary to allocate additional pilot signals to every frequency carrier and every time slot adjacent to the part of the transmission bandwidth which is not used to transmit signals, but it might be sufficient to allocate the additional pilot signals to frequency carriers adjacent to said part of the transmission bandwidth which is not used to transmit signals in a time slot distribution which corresponds to the time slot distribution of the original pilot pattern and to perform the channel estimation on the basis of such a pilot pattern. Hereby, an increased capacity for data transmission and a still more reliable channel estimation is achieved. Alternatively, additional pilot signals may be mapped onto every frequency carrier adjacent to said part of said transmission bandwidth which is not used to transmit signals in the time dimension and the channel estimation could be performed on the basis of such a pilot pattern with additional pilot signals. Hereby, a more reliable channel estimation on a receiving side could be achieved.

The present invention is further applicable to multi-carrier systems in which frequency carriers with pilot signals are arranged in one or more training or preamble patterns and frequency carriers with data are arranged in one or more data patterns. In other words, the pilot signals are transmitted in preamble symbols or training symbols and the data are transmitted in data symbols, whereby the preamble symbols or training symbols are used on the receiving side for channel estimation (and eventually for additional tasks such as frequency and time synchronization and so forth depending on the system requirements). In such systems, the present invention suggests to map additional pilot signals on frequency carriers for said data pattern adjacent to the part of the transmission bandwidth which is not used to transmit signals and to perform the channel estimation on the basis of such a pilot pattern. Since a part of the frequency carriers with pilot signals of the training or preamble pattern can not be transmitted due to the frequency notching, the present invention suggests to arrange and map pilot signals onto frequency carriers of the data pattern adjacent to the frequency notch and to perform the channel estimation on the basis of such a pilot pattern. In other words, since the training pattern (usually) only comprises pilot signals arranged in a certain way, the present invention suggests to map additional pilot symbols not within the training pattern, but within the data pattern in order to enable a more reliable channel estimation on the receiving side. Hereby, the present invention suggests to either map additional pilot signals on every carrier for the data pattern adjacent to said frequency notch, or to map the additional pilot signals with a (regular or not regular) time distribution corresponding to the (regular or not regular) time distribution of the original pilot pattern and to perform the channel estimation on the basis of the resulting pilot pattern.

It is to be understood that the two above explained concepts of the present invention could be mixed and applied to systems in which pilot signals are transmitted in preambles or training patterns as well as embedded within data in data symbols.

Further, it should be understood that the above explained concepts for pilot patterns for multi-carrier systems with notched frequencies can be used in permanent or semi-permanent systems, in which the notched frequencies are known at the time when the system is being set up, so that the pilot pattern can be adapted from the beginning to the notched frequencies and the transmitting side (apparatus) as well as the receiving side (apparatus) know about the presence, the location and the width of the notched frequencies. Hereby, no further information exchange between transmitter and receiver in relation to the notched frequencies is necessary during the operation of the system and the system setup (including eventual updates from time to time) is done externally. Alternatively, the above explained concepts for pilot patterns for multi-carrier systems with notched frequencies can be used in dynamic systems, in which it is necessary to adjust and change the location and the width of the notched frequencies regularly or from time to time. This can for example be implemented by enabling the transmitter to dynamically change the pilot pattern depending on the presence of a frequency notch and by enabling the receiver to perform said channel estimation on the basis of such a dynamically changed pilot pattern. The presence (and location and width etc.) of the frequency notch could be detected by the transmitter and signalled to the receiver (or vice versa) or could be detected by another entity of the system and signalled the both the transmitter and the receiver. Hereby, the signalled information could include only the location (and width etc.) of a frequency notch and the transmitter and the receiver then would know which new pilot pattern shall be used due to pre-stored information in this respect. Or, the signalling information would include the location (and width etc.) of the notch as well the respective new pilot pattern to be used.

As an alternative or as an addition to the use of additional pilot signals on frequency carriers adjacent to the part of the transmission bandwidth which is not used to transmit signals, the present invention suggests to shift the original pilot pattern in the frequency dimension and to perform the channel estimation on the basis of such a shifted pilot pattern so that a channel estimation for frequency carriers next to said part of said transmission bandwidth which is not used to transmit signals is possible. In cases where the frequency notch, i.e. the part of the transmission bandwidth which is not used to transmit signals, is smaller than the (time interpolated) repetition rate of the pilot signals in the frequency direction, it is possible, if some pilot signals of the original pilot pattern fall within the frequency notch, to shift the pilot pattern in the frequency dimension so that the frequency notch falls within two adjacent frequency signals in the frequency dimension. Thereby, no pilot signals are lost and the receiving side is able to perform a more reliable channel estimation for all received frequency carriers. On the other hand, in case that the frequency notch is larger than the distance between two adjacent pilot signals in the frequency dimension, additional pilot signals have to be mapped onto the frequency carriers immediately adjacent the frequency notch as explained above.

It is to be understood that the terms transmitting apparatus and receiving apparatus used in the present specification are intended to cover all possible present and future wireless, wired, mobile, portable, non-portable, stand-alone, combined and the like devices, and are intended to include all possible implementations of the described and claimed functionalities. For example the transmitting apparatus can include receiving functionalities including but not limited to the functionalities described for the receiving apparatus of the present invention and vice versa. Further, it is to be noted that the term pattern, as e.g. used for pilot, preamble, training or data pattern is intended to describe the situation in the frequency domain in which the baseband processing of devices of frequency multi-carrier system normally takes place, including the modulation or mapping of pilot signals, data signals or other information signals onto the frequency carriers. The term symbol is then to describe the situation in the time domain into which the frequency domain signals (or patterns) were transformed in the transmitter and then transmitted after the respectively necessary processing depending on the used transmission or communication system. Also, it should be understood that the present invention is intended to cover all present and future frequency ranges for the transmission bandwidth used in the multi-carrier system. Also, the present invention is intended to cover all possible locations, widths, etc. of the frequency notch or notches in the transmission bandwidth. The present invention is also not limited to any specific kind, width etc. of frequency carriers.

The present invention is described in more detail in the following description of preferred embodiments in relation to the enclosed drawings, in which.

In the following description of preferred embodiments, the present invention is explained on the basis of an OFDM system, in which data, i.e. signalling data, information content data or any other kind of data, and pilot signals are mapped onto mutually orthogonal frequency subcarriers. As set-out above, however, the present invention may be applied to any communication system or transmission system or link using a plurality of separate frequency carriers, onto which the data, the pilot signals and so forth are mapped, for the transmission within the given frequency bandwidth.

Figure 2:
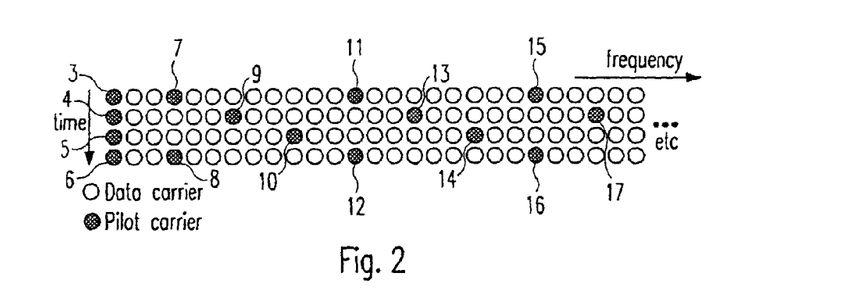
FIG. 2 shows a frequency/time diagram of data carriers with embedded pilot carriers.

FIG. 2 shows a schematic frequency/time diagram of subcarriers of an OFDM system in which a plurality of pilot signals arranged in a pilot pattern are embedded within a (temporal) stream of data signals mapped onto respective frequency subcarriers. Most broadcast systems use a continuous transmission of data symbols in which pilot signals are embedded, but some of the recently proposed broadcast systems use a temporal frame structure in which pilot symbols are transmitted in training symbols or preamble symbols and the data are transmitted in data symbols. Bi-directional communication systems in which content, signalling data and so forth is exchanged between two transceivers typically use temporal frame structures, such as frame bursts, but may also use other suitable structures.

FIG. 2 shows an example in which the first frequency subcarrier in each time slot carries a pilot signal 3, 4, 5, 6. Further, a pilot pattern with a regular frequency and time distribution of pilot signals 7, 8, 9, 10, 11, 12, 13, 14, 15, 16, 17 is distributed over and embedded in the subcarriers carrying data. Hereby, in the first time slot shown in the diagram of FIG. 2, the forth subcarrier carries a pilot signal 7, as well as the thirteenth subcarrier 11 and the twenty-second subcarrier 15. In the second time slot, the seventh subcarrier 9, the sixteenth subcarrier 13 and the twenty-fifth subcarrier 17 carry pilot signals. In the third time slot, the tenth subcarrier 10 and the nineteenth subcarrier 14 carry pilot signals. In the fourth time slot, the pilot signals are arranged on the same subcarriers as in the first time slot, namely the fourth subcarrier 8 carries a pilot signal, the thirteenth subcarrier 12 as well as the twenty-second subcarrier 16. In other words, the arrangement of the pilot signals is repeated every fourth time slot, the pilot signals are arranged on every tenth time slot and the shift between the pilot signals in a specific time slot and the immediately succeeding time slot is three subcarriers. For example, the pilot signal on the fourth subcarrier 7 in the first time slot and the pilot signal on the seventh subcarrier in the second time slot in FIG. 2 are shifted by three subcarriers.

It is to be understood that the repetition rate of the pilot signals in each time slot as well as the temporal repetition rate of the pilot signals as shown in FIG. 2 (as well as the other figures of the specification) are only an example and that any other pilot pattern can be used depending on the respective system requirements. Further, although regular pilot patterns with a repetitive and/or regular structure seem to be more commonly used, it is possible to use any kind of suitable regular or irregular pilot pattern (in the time and/or frequency dimension) depending on the system requirements. In the present description, the term pilot pattern is not restricted to any kind of regular or repetitive pattern but includes any kind of suitable arrangement of the pilot signals.

After the generation of a subcarrier pattern with pilot signals and data signals as for example shown in FIG. 2 and the corresponding transformation of the subcarrier pattern into the time domain and the processing and transformation of time domain signals into the actual transmission signals, symbol bursts and the like depending on the respectively used communication or transmitting system in a respective transmitting apparatus or transceiving apparatus, the signals are received in a receiving or transceiving apparatus on a receiving side and processed back into the frequency domain. In the receiving or transceiving apparatus receiving the signals, the signals are processed and transformed back into the frequency domain. The received pilot signals are then used to perform a channel estimation for the data carrying frequency subcarriers the content and the characteristics of the pilot signals are known to the receiver, for example, the receiver knows the amplitude and the phase of the pilot signals which are to be expected. Often, pseudo noise (pn) sequences are used but other suitable sequences can be applied. The comparison of the known and expected pilot signal with the actually received pilot signal enables the receiver to perform channel estimation for the data carrying frequency subcarriers between adjacent pilot signals in the frequency as well as in the time dimension. For example, the receiver may first perform a time interpolation between two adjacent pilot signals, where after the time interpolated values for each frequency subcarrier are interpolated again in the frequency direction, so that a channel estimation and correction value is obtained for each subcarrier. Of course, other ways to obtain the channel estimation values for the data subcarriers can be used.

The specific choice of the pilot pattern and the pilot signal density depends on the system requirements and architecture. Although an increase of the number of pilot signals normally enhances the channel estimation quality, the transmission capacity is decreased, so that the design of the pilot pattern is always a compromise between channel throughput and channel estimation quality. An important design factor is the so called Nyquist criterion, whereby often some oversampling is added in order to guarantee a proper channel estimation on the receiving side.

Figure 3:
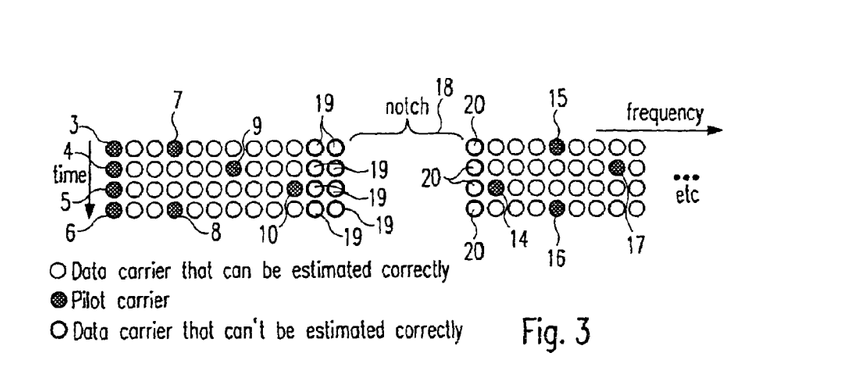
FIG. 3 shows a frequency/time diagram of FIG. 2 for the case that a part of the transmission bandwidth is not used for transmission.

However, most systems are designed in a way that the channel estimation quality is reduced if one or more pilot signals are missing or cannot be received on the receiving side. An example is visualized in FIG. 3 which shows the frequency/time diagram of FIG. 2 with a part 18 of the transmission bandwidth missing. In case of notched systems, as explained above, a small part of the entire transmission bandwidth is cut-out or notched and therefore not used for the transmission of signals. In the example of FIG. 3, a number of for example six subcarriers are not used to transmit signals, so that the pilot signals of the subcarriers, in the shown example the pilot signals 11, 12, 13 are not transmitted and can therefore not be used to perform a channel estimation on a receiving side. Consequently, the subcarriers 19 and 20 in the areas adjacent to the part 18 which is not used for signal transmission cannot be properly channel estimated on the receiving side. These adjacent areas consist of the subcarriers between the frequency notch 18 and the next (in frequency dimension) subcarriers with pilot signal, in the shown example the subcarriers 10 and 14.

Figure 4:
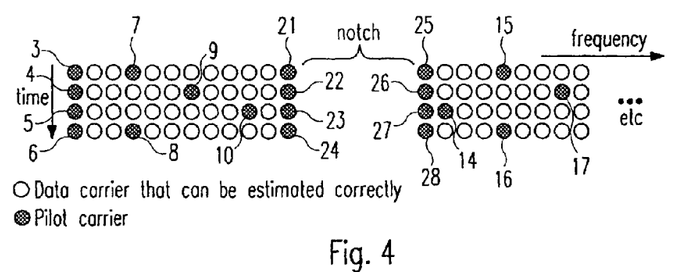
FIG. 4 shows the frequency/time diagram of FIG. 3 with additional pilot signals.

In a first embodiment, the present invention suggests to map additional pilot signals to the frequency subcarriers adjacent the part 18 of the transmission bandwidth which is not used for signal transmission, as for example shown in FIG. 4. FIG. 4 shows the frequency/time diagram of FIG. 3, whereby additional pilot signals 21, 22, 23, 24, 25, 26, 27, 28 are mapped onto every frequency subcarrier immediately adjacent or at the edge of the part 18 of the transmission bandwidth which is not used for signal transmission. If an additional pilot signal is mapped to every frequency subcarrier immediately adjacent the part 18, the reliability of the channel estimation on the receiving side is significantly enhanced. However, in order not to reduce the data throughput too much, it can be sufficient for a more reliable channel estimation if additional pilot signals are mapped not on every frequency subcarrier immediately adjacent the part 18, but only onto some of the frequency subcarriers. For example, it might be sufficient if the additional pilot signals have the same time distribution as the original pilot pattern. In the example of FIG. 4, it might thus be sufficient if only additional pilot signals 21, 24, 25, 28 are mapped onto the frequency subcarriers immediately adjacent the part 18, so that the temporal repetition rate of three symbols of the original pilot pattern is maintained. The frequency subcarriers 22, 23, 26, 27 would then be available for data signals. More generally, it might be sufficient to map additional pilot signals on subcarriers adjacent the part 18 in any kind of suitable frequency and/or time scheme or distribution which enables a good and more reliable channel estimation on the receiving side but still provides a good data throughput. In such a case, the density of additional pilot signals might even be wider or less wide than the time and/or frequency distribution of the original pilot pattern. Also, it might be advantageous to allocate the additional pilot signals only to subcarriers immediately adjacent to the frequency notch 18, but it is also alternatively or additionally possible to add the additional pilot signals to any suitable subcarriers between the frequency notch 18 and the next (in frequency dimension) subcarriers with pilot signal, in the shown example the subcarriers 10 and 14. also, it might be advantageous to use pseudo noise (pn) sequences for the additional pilot signals, but other suitable sequences can be applied. The above statement in relation to the location, nature and characteristics of the additional pilot signals apply to all embodiments described herein.

The above example and embodiment of the invention was based on a system in which pilot signals are embedded within data carriers, such as for example in classical broadcast systems in which the data are transmitted in a continual temporal stream with the pilots embedded therein.

The following example and embodiment is directed to systems in which pilot signals are transmitted in preamble symbols or training symbols and the data are transmitted in data symbols. In bi-directional communication systems, the preambles or training symbols are for example used for time and/or frequency synchronisation, (frequency and sampling frequency) off-set correction, channel estimation and/or automatic gain control adjustment on the receiving side. In more recently proposed broadcast OFDM systems, preambles or training symbols are for example used at the start of each temporal frame, wherein a frame comprises one or more preambles or training symbols and multiple data symbols, for initial channel estimation and/or off-set correction and also for the potential signalling of very basic transmission parameters.

Figure 5A:
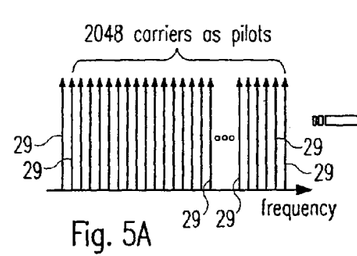
FIG. 5A shows a frequency domain representation of a preamble and FIG. 5B shows a time domain representation of the preamble of FIG. 5A.
Figure 5B:
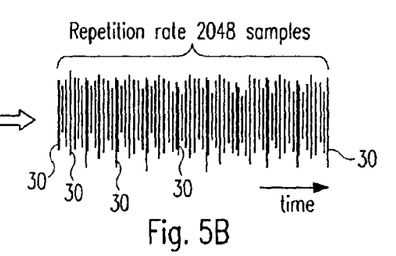
Figure 6A:
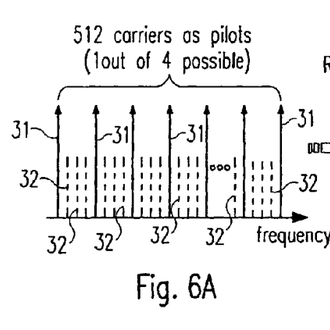
FIG. 6A shows a further example of a frequency domain representation of a preamble and FIG. 6B shows a time domain representation of the preamble of FIG. 6A.
Figure 6B:
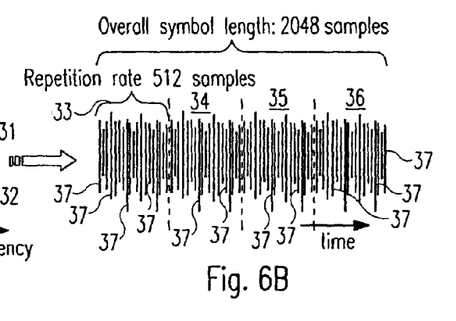
Figure 7:
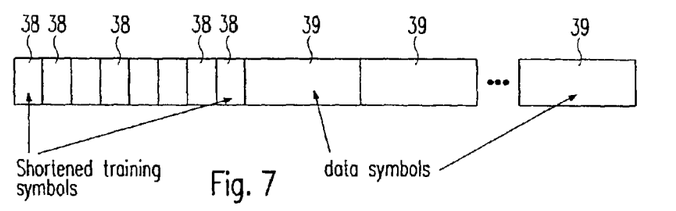
FIG. 7 shows a schematic representation of an example of a OFDM burst with shortened training symbols and several data symbols.

FIG. 5A shows a frequency domain representation of an example of preamble or training pattern in which every subcarrier 29 carries a pilot signal, so that for example all available 2048 frequency subcarriers carry a respective pilot. FIG. 5B shows a time domain representation of the preamble or training pattern of FIG. 5A. The time domain preamble symbol or training symbol has in the shown example 2048 time samples 30 forming the symbol and the repetition rate is 2048 time samples. FIG. 6A shows a frequency domain representation of a preamble pattern or training pattern in which only every fourth subcarrier 31 carries a pilot signal and the intermediate subcarriers 32 are mapped with zeros. After transformation in the time domain, as shown in FIG. 6B, the time domain signal of the preamble symbol or training symbol shows four repetitions (corresponding to the fact that every fourth subcarrier carries a pilot signal), each repetition pattern 33, 34, 35, 36 having the identical time samples 37. Every repetition pattern has a length of 512 samples so that the overall symbol length is again 2048 samples in the shown example. Of course, other numbers may be appropriate depending on the wanted application and the used communication system. Generally, a decreased pilot signal density in the frequency domain results in a higher number of repetitions in the time domain. These shortened training symbols or preamble symbols, i.e. each repetition pattern is considered to be a shortened training symbol or preamble symbol, still enables a complete channel estimation if the usual conditions, such as the Nyquist conditions are fulfilled. FIG. 7 shows a schematic example of a typical OFDM burst with shortened training symbols 38 followed by a number of data symbols 39. The shortened training symbols enable a reliable and good channel estimation in a shorter time as compared to longer training symbols. In our examples, the shortened training symbols resulting from the example of FIG. 6 enable a much faster but still reliable channel estimation as compared to the example of FIG. 5.

Figure 8:
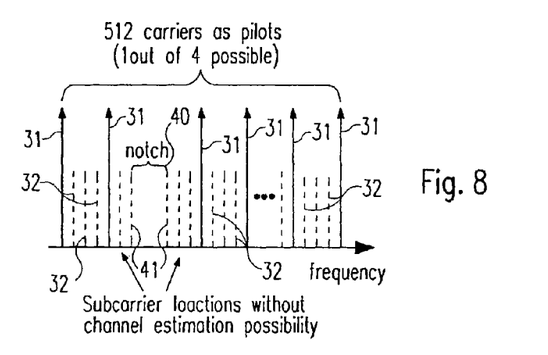
FIG. 8 shows a frequency domain representation of a shortened preamble or training pattern in which a part of the transmission bandwidth is not used for transmission.
Figure 9A:
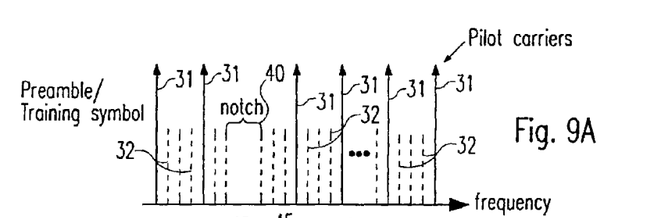
FIG. 9A shows again the shortened preamble of FIG. 8
Figure 9B:
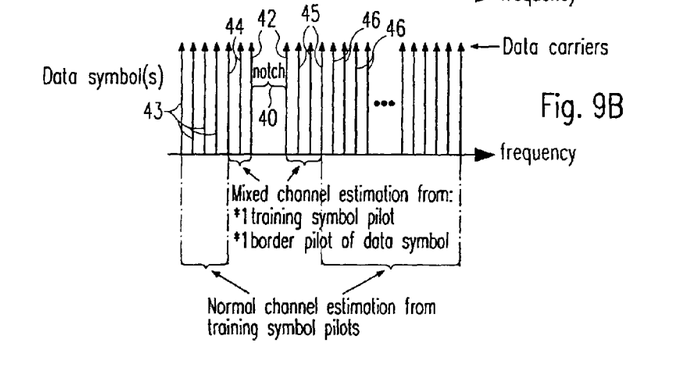
FIG. 9B shows the frequency domain representation of a corresponding data pattern with additional pilot signals at the edges of a part of the transmission bandwidth which is not used for signal transmission.

However, in case that a part of the entire transmission bandwidth is not used for signal transmission, this means that a part of the preamble symbol or training symbol will not be transmitted so that the receiving side lacks pilot symbols for the channel estimation. An example is shown in FIG. 8 which shows a frequency domain representation of a preamble pattern or training pattern similar to the one of FIG. 6A, whereby a part 40 of the entire transmission bandwidth is not used for signal transmission. Particularly in the case where only every m-th frequency subcarrier of the training or preamble pattern (m being a natural number larger 1) carries a pilot signal, it is not possible to add additional pilot signals on the frequency subcarriers immediately adjacent the part 40 which is not used for signal transmission, for example the subcarriers 41, since the repetition rate of the pilot signals in the preamble pattern or training pattern would be disturbed and it would not be possible to obtain proper repetition patterns in the time domain (cf. explanation of FIG. 6B). In this embodiment, the present invention therefore suggests to add additional pilot signals on the frequency subcarriers of the data pattern which are immediately adjacent the part 40 which is not used for signal transmission. FIG. 9A and FIG. 9B visualise this concept. FIG. 9A essentially corresponds to FIG. 8 and shows a frequency domain representation of the preamble or training pattern in which every fourth subcarrier 31 carries a pilot signal and the intermediate subcarriers 32 are empty or carry zeros. The part 40 of the bandwidth which is not used to transmit signals would have carried a pilot signal which can now not be transmitted to the receiver. Therefore, an additional pilot signal is added to each subcarrier 42 immediately adjacent or on the edge of the part 40 which is not used for signal transmission in the data pattern as shown in FIG. 9B. The data pattern normally carries only data signals on each frequency subcarrier but now carries additional pilot signals on the subcarriers 42 adjacent to the frequency notch. Thus, on the receiving side, the subcarriers carrying the data are channel estimated on the basis of the pilot signals of the preamble or training pattern, except the subcarriers in the regions adjacent to the part 40 of the unused transmission bandwidth. In the example of FIG. 9B, the subcarriers 44 of the data pattern are for example channel estimated by using the additional pilot signal 42 on the edge of the frequency notch close to them as well as the pilot signal in the preamble or training pattern on the same subcarrier as one of the data subcarriers. Similarly, the data subcarriers 45 in the opposite region adjacent to the frequency notch are channel estimated by using the additional pilot signal 42 on the edge of the frequency notch and a pilot signal from the preamble or training pattern. Although FIG. 9B only shows a single data pattern, it should be clear that depending on the design of the time domain OFDM bursts or symbols, it is possible that each burst comprises one or more data symbols. In this case, it is possible to add the additional pilot signals only in one data pattern, several data patterns or all data patterns that follow the preamble or training pattern. All subcarriers in the data patterns that are not affected by the frequency notch can still be channel estimated from the pilot signals in the shortened training pattern. Subcarriers of the data pattern, which are affected by the frequency notch can be channel estimated from a mix of pilot signals from the training pattern and the additional pilot signal 42 of the one or more data patterns. With such a concept, the time structure of the OFDM bursts remains unchanged.

It should be noted that in some systems a mixture between preamble or training patterns with pilot signals and data patterns with embedded pilot signals are possible. For these cases it is possible to combine the concepts of the present invention as explained in relation to FIG. 4 and FIG. 9B.

The concept of the first and the second embodiment is also applicable to MIMO (multiple input multiple output) systems with two or more transmitters. Such MIMO systems need orthogonal pilot structures in order to enable the receiver or the receivers to extract the channel estimates of all available propagation paths. For MIMO systems with two (or more) transmitters, alternating pilot structures can be used, whereby one transmitter transmits the original pilot pattern and the other transmitter alternates the sign (or uses complex conjugates) of the original pilot structure for every other pilot in frequency (and eventually also in the time) direction. It is also possible to use specific orthogonal pilot signals (without inversion) transmitted by the two or more transmitters as long as a receiver can distinguish from which transmitters the respective pilot signals come.

Figure 10:
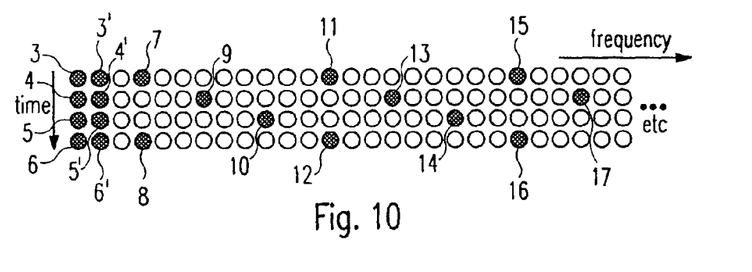
FIG. 10 shows a frequency/time diagram similar to FIG. 2 but for the case of two transmitters.
Figure 11:
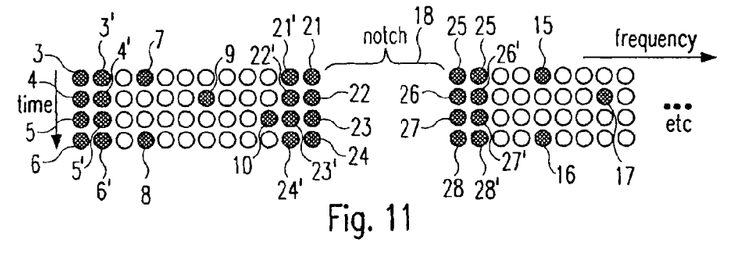
FIG. 11 shows a frequency/time diagram for the case of FIG. 10 with additional pilot signals at the edges of the part of the transmission bandwidth which is not used for signal transmission.

FIG. 10 shows a frequency time diagram of (a non-limiting example of) a MIMO system with two transmitters similar to the one shown in FIG. 2. Hereby, in MIMO systems, the first two subcarriers of each time slot and the last two frequency subcarriers in each time slot are mapped with a respective pilot signal. In FIG. 10, in addition to the pilot signals 3, 4, 5, 6 of the first frequency subcarriers, the second subcarriers also carry pilot signals 3', 4', 5' and 6'. Hereby, if the first transmitter transmits a time domain signal corresponding to the frequency domain signal as shown in FIG. 10, the second transmitter will transmit a similar signal, but with every other pilot signal having an inverted sign or being the conjugate complex, for example, the pilot signals 3', 4', 5' and 6' transmitted by a second transmitter may be inverted (opposite sign or complex conjugate in relation to the respective pilot signals transmitted by the first transmitter). Also, for example, the second transmitter may transmit the pilot signals 7, 9, 10, 12, 15, 17 and so forth with inverted values as compared to the respective pilot signals transmitted by the first transmitter. FIG. 11 shows the allocation of additional pilot signals in case that the system of FIG. 10 is frequency notched. Similar to the previous embodiment especially the one described in relation to FIG. 4, additional pilot signals are mapped onto the frequency subcarriers immediately adjacent the part 18 of the transmission bandwidth which is not used for signal transmission. Hereby, for the described MIMO system with two transmitters, the two immediately adjacent frequency subcarriers carry additional pilot signals 21, 21', 22, 22', 23, 23', 24, 24', 25, 25', 26, 26', 27, 27', 28, 28'. Hereby, every other pilot signal transmitted by the second transmitter is inverted (sign alternation or complex conjugate) in relation to the respective pilot signal in the same frequency subcarrier transmitted by the first transmitter. For example, the second transmitter may transmit the pilot signal 21, 22, 23, 24, 25, 26, 27, 28 with the identical values as the first transmitter, but the pilot signals 21', 22', 23', 24', 25', 26', 27' and 28' with respectively inverted values in relation to the first transmitter. The other pilot signals, i.e. the original pilot pattern transmitted by the first and the second transmitter accept in the frequency subcarriers within the frequency notch remains unchanged.

Figure 12:
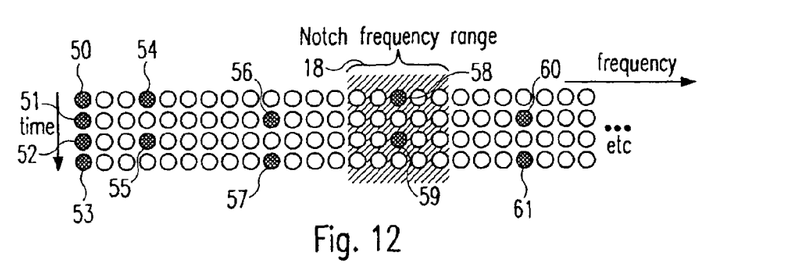
FIG. 12 shows a frequency/time diagram of pilot signals embedded in data signals in which the distance between adjacent pilot signals in the frequency dimension is larger than the width of the unused transmission bandwidth.
Figure 13:
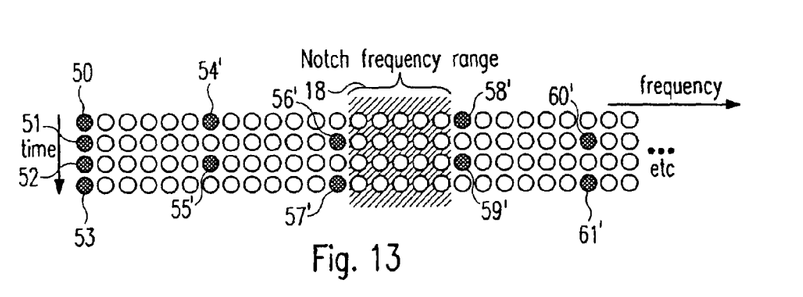
FIG. 13 shows the case of FIG. 12 but with a shifted pilot pattern so that the unused transmission bandwidth does not coincide with pilot signals.

In the following, a further alternative embodiment of the present invention is explained. FIG. 12 shows a frequency time diagram of a system similar to the one explained in relation to FIG. 2, in which a pilot pattern of pilot symbols is inserted or embedded within a stream of data carriers. Similar to FIG. 2, the system of FIG. 12 has a pilot signal 50, 51, 52 and 53 in the first frequency subcarrier of each time slot. Further, the system has a regularly distributed pattern of pilot signals 54, 55, 56, 57, 58, 59, 60, 61 embedded in between frequency subcarriers with data. A part 18 of the frequency bandwidth is not used for a transmission of signals, i.e. notched, so that for example pilot signals 58 and 59 are not transmitted. However, since the width of the part 18 which is not used to transmit signals is below the time interpolated repetition rate or distance between pilot signals and the frequency direction, it is possible to just shift the entire pilot pattern (but not the pilots in the first frequency subcarriers) so that the part 18 is in between pilot signals in order to avoid that pilot signals of the original pilot pattern fall within the frequency notch. FIG. 13 visualises the situation after this shifting of the pilot pattern. Pilot pattern of FIG. 12 has been shifted by three subcarriers in the frequency dimension so that the frequency notch now lies in between adjacent pilots and no pilots fall within the part 18 which is not used for signal transmission. Thus, the entire pilot pattern is preserved, the receiving side can perform a good and reliable channel estimation for all frequency subcarriers. In other words, the pilot pattern is shifted by one or more frequency subcarrier positions in order to have no pilots within the frequency notch. The shift, i.e. the number of subcarriers by which the pilot pattern is to be shifted, can be signalled from a transmitter to a receiver as a basic physical layer information, for example part of a preamble, or by any other suitable way.

Figure 14:
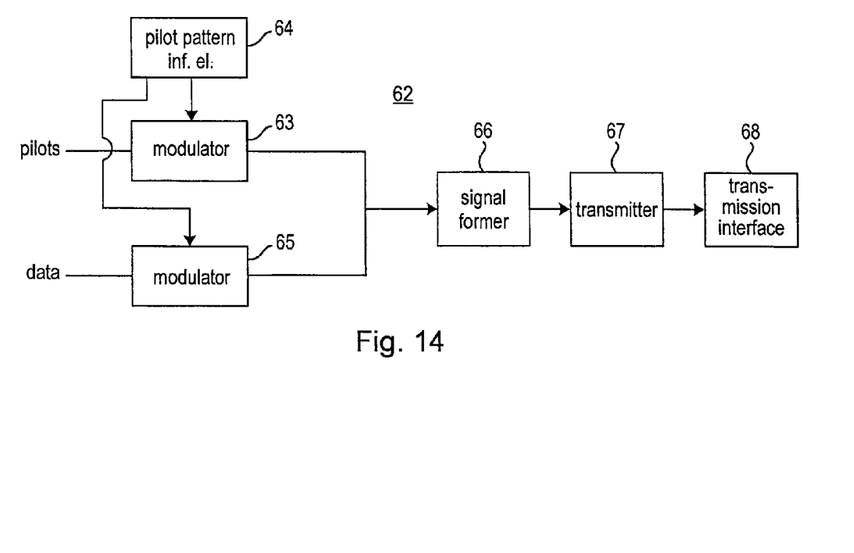
FIG. 14 shows a schematic block diagram of a transmitting apparatus according to the present invention.

FIG. 14 shows a schematic diagram of a transmitting apparatus of the present invention, which comprises the necessary elements and structures to perform a change of the pilot pattern as suggested by the present invention and described in the foregoing embodiments. It is to be understood that FIG. 14 (as well as FIG. 15) only show the structural elements necessary and adapted to perform the functionalities of the present invention, but that additional elements which are necessary for the actual operation of the transmitting and the receiving apparatus are not shown for the sake of clarity. Correspondingly, the transmitting apparatus 62 of the present invention comprises a modulation means or element 63 which is adapted to modulate or map pilot signals onto frequency carriers of the respectively used multicarrier system. The transmitting apparatus 62 further comprises a pilot pattern information means or element 64 which is adapted to provide the modulation means 63 with information about how the pilot signals should be mapped onto the frequency carriers, for example, if a part of the transmission bandwidth is to be notched, i.e. not to be used for signal transmission, and additional pilot carriers should be allocated to subcarriers immediately adjacent the frequency notch, such as explained in relation to FIGS. 2 to 11, or if the pilot pattern should be shifted as explained in relation to FIGS. 12 and 13. The pilot pattern information means 64 obtains such information and controls (or at least informs) the modulation means 63 correspondingly, so that additional pilot signals are allocated or the entire pilot pattern is shifted. The pilot pattern information means 64 can hereby receive the respective pilot pattern change and information from another entity via signalling information, or such information may be stored in the pilot pattern information means 64 when the transmitting apparatus 62 of the present invention is initialized, or the transmitting apparatus 62 has some kind of possibility to detect or measure frequency notches and to adapt the pilot pattern correspondingly. In such cases, a detector for frequency notches can be included in the pilot pattern information means 64. The transmission apparatus 62 further comprises a modulation means 65 which is adapted to modulate data signals onto frequency carriers on the basis of corresponding information from the pilot pattern information means 64. Especially after changes of the pilot pattern, the modulation means 65 needs to know which frequency carriers are available for data and which are not. The data carriers from the modulation means 65 and the pilot carriers from the modulation means 63 are then combined in line with the required communication system, for example by embedding the pilot carriers within the data carriers, or by forming preamble or training patterns with the pilot signals and by forming separate data patterns with the data signals. A signal forming means or element 66 then forms a typical time domain signal or symbol from the pilot signals and data signals after their transformation to the time domain (not shown), whereafter the just formed signals are processed and prepared for a transmission by a transmission means 67 and transmitted by a transmission interface 68. The transmission interface 68 can be wireless interface, such as an antenna, an antenna pattern or the like, or a wired interface.

Figure 15:
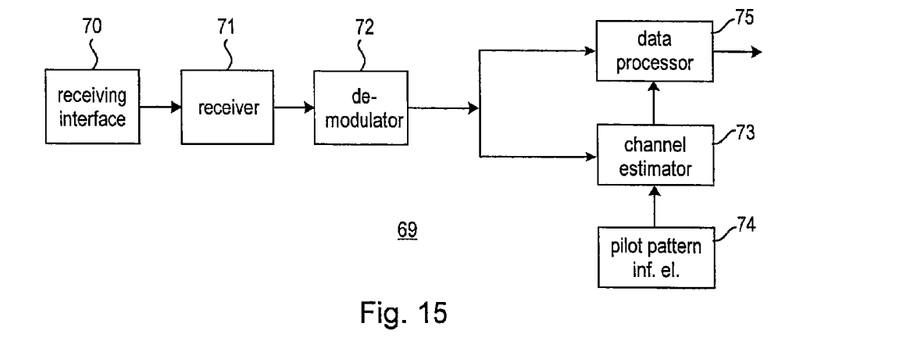
FIG. 15 shows a schematic block diagram of a receiving apparatus according to the present invention.

FIG. 15 shows a schematic block diagram of a receiving apparatus 69 according to the present invention, which is adapted to receive signals for example from a transmitting apparatus 62 of the present invention and comprises the necessary structural elements adapted to perform the functionalities of the present invention as described in the above embodiments. Hereby, signals are received by a receiving interface 70, which may be a wireless interface, such as an antenna, an antenna pattern or the like, or a wired interface. The received signals are then processed, for example down converted or the like, by a receiving means or element 71 and then demodulated in a demodulation means or element 72. The demodulation means 72 performs a transformation of the received (time domain) signals into the frequency domain, i.e. into frequency carriers. The data carriers are then further processed, e.g. by de-mapping the data information from the frequency carriers, in a data processing means or element 75. The pilot carriers which are embedded in the data carriers or are present as separate training or preamble patterns in the frequency carriers from the demodulation means 72 are detected and processed by a channel estimation means or element 73 which provides the data processing means or element 75 with the necessary information enabling a proper channel estimation and de-mapping of the data carriers. Hereby, the receiving apparatus 69 comprising pilot pattern information means or element 74 provides the channel estimation means or element 73 with the necessary information about where and how the pilot signals are mapped onto the frequency carriers. The pilot pattern information means or element 74 obtains or provides information to the channel estimation means or element 73 about the presently used or changed pilot patterns as described in the previous embodiments. For example, in case that additional pilot signals are added to frequency carriers immediately adjacent a frequency notch as is explained in relation to FIGS. 2 to 11, pilot pattern information means or element 74 provides such information to the channel estimation means 73 so that a proper channel estimation is enabled. Similarly, in case that the pilot pattern is shifted as described in relation to FIGS. 12 and 13, the pilot pattern information means or element 74 provides such information to the channel estimation means or element 73. Information about shifted pilot patterns or additional pilot signals can be obtained in the receiving apparatus 69 from a transmitting apparatus by means of signalling data or the like, or through another channel informing the receiving apparatus 69 about changes in the pilots and/or the pilot pattern. Also, the receiving apparatus may just receive information about notched frequencies or frequency bands, whereafter the pilot pattern information means or element 74 automatically knows which pilot pattern changes or additional pilot signals will be used and informs the channel estimation means 73 correspondingly.

It is to be understood that every additional pilot signal result in the decreased data throughput. Therefore, in order to save overhead, a dynamic handling of the additional pilot signals may be advantageous. Hereby, the transmitting apparatus 62 and/or the receiving apparatus 69 may determine or obtain corresponding information from a third entity if the frequency notch includes pilot locations that are needed for the channel estimation. If this is true, the additional pilot signals immediately adjacent to the frequency notch are inserted on the transmitter side and evaluated on the receiver side as described. If no pilot locations are affected by the frequency notch, no additional pilots are inserted. Also, it is possible to dynamically notch parts of the frequency band which should not be used for signal transmission only for specific times and locations. Typically, the transmitting apparatus 62 may signal the presence of the notches to the receiving apparatus 69 and/or vice versa. This approach is advantageous in bi-directional systems, such as digital cable systems and the like, in which a signalling of data between the transmitter and the receiver is enabled. The present invention is also suitable for a semi-permanent approach in a situation where the transmitting apparatus 62 and the receiving apparatus 69 operate in an environment where the notching of certain frequency ranges is always necessary, wherein the notching and the additional pilot signals or the pilot pattern shifting is prestored in the transmitter and the receiver when initializing the system.

The invention claimed is:

1. A transmitting apparatus for transmitting signals in a multi-carrier system, in which pilot signals and data mapped on frequency carriers are transmitted in a transmission bandwidth, wherein a part of said transmission bandwidth is not used to transmit signals, comprising:
   a pilot signal mapper configured to map pilot signals onto frequency carriers according to a pilot pattern that is adapted for a channel estimation in a corresponding receiving apparatus, and to shift the pilot pattern in the frequency dimension so that a channel estimation for frequency carriers next to said part of said transmission bandwidth that is not used to transmit signals is possible,
   wherein the pilot signal mapper is configured to shift the pilot pattern in the frequency dimension so that at least one of the pilot signals in the pilot pattern is located on a frequency carrier that is immediately adjacent to said part of the transmission bandwidth that is not used to transmit signals.

2. The transmitting apparatus according to claim 1,
   wherein frequency carriers with said pilot signals are embedded within frequency carriers with said data.

3. The transmitting apparatus according to claim 2,
   wherein, when said pilot pattern has a distribution of said pilot signals in a time dimension, said pilot signal mapper is configured to map additional pilot signals on frequency carriers adjacent to said part of said transmission bandwidth that is not used to transmit signals with a time distribution corresponding to a time distribution of the pilot pattern.

4. The transmitting apparatus according to claim 2,
   wherein said pilot signal mapper is configured to map additional pilot signals on every frequency carrier adjacent to said part of said transmission bandwidth that is not used to transmit signals in the time dimension.

5. The transmitting apparatus according to claim 1,
   wherein frequency carriers with said pilot signals are arranged in at least one training pattern, and frequency carriers with said data are arranged in a data pattern, wherein said pilot signal mapper is configured to use a pilot pattern with additional pilot signals on frequency carriers for said data pattern adjacent to said part of said transmission bandwidth that is not used to transmit signals.

6. The transmitting apparatus according to claim 5,
   wherein, when said pilot pattern has a distribution of said pilot signals in a time dimension, said pilot signal mapper is configured to map said additional pilot signals on frequency carriers of said data pattern adjacent to said part of said transmission bandwidth that is not used to transmit signals with a time distribution corresponding to a time distribution of the pilot pattern.

7. The transmitting apparatus according to claim 5,
   wherein said pilot signal mapper is configured to map said additional pilot signals on every frequency carrier for said data pattern adjacent to said part of said transmission bandwidth that is not used to transmit signals in the time dimension.

8. The transmitting apparatus according to claim 1,
   wherein said pilot signal mapper is configured to change said pilot pattern depending on a presence of a part of said transmission bandwidth that is not used to transmit signals.

9. The transmitting apparatus of claim 1, wherein the pilot signal mapper is configured to shift the pilot pattern in the frequency dimension so that none of the pilot signals in the pilot pattern are located within the part of the transmission bandwidth that is not used to transmit signals.

10. A transmitting method for transmitting signals in a multi carrier system, in which pilot signals and data mapped on frequency carriers are transmitted in a transmission bandwidth, wherein a part of said transmission bandwidth is not used to transmit signals, the method comprising:
    mapping pilot signals onto frequency carriers according to a pilot pattern that is adapted for a channel estimation on a receiving side, and
    shifting the pilot pattern in the frequency dimension so that a channel estimation for frequency carriers next to said part of said transmission bandwidth is possible, wherein the shifting step comprises shifting the pilot pattern in the frequency dimension so that at least one of the pilot signals in the pilot pattern is located on a frequency carrier that is immediately adjacent to said part of the transmission bandwidth that is not used to transmit signals.

11. A receiving apparatus for receiving signals in a multi-carrier system, in which pilot signals and data mapped on frequency carriers are transmitted in a transmission bandwidth, wherein a part of said transmission bandwidth is not used to transmit signals, comprising:
    a channel estimator configured to perform a channel estimation for received signals on the basis of pilot signals arranged in a pilot pattern, wherein said channel estimator is configured to perform a channel estimation on the basis of a changed pilot pattern shifted in a frequency dimension so that a channel estimation for frequency carriers next to said part of said transmission bandwidth that is not used to transmit signals is possible, wherein the pilot pattern is shifted in the frequency dimension so that at least one of the pilot signals in the pilot pattern is located on a frequency carrier that is immediately adjacent to said part of the transmission bandwidth that is not used to transmit signals.

12. The receiving apparatus according to claim 11,
    wherein frequency carriers with said pilot signals are embedded within frequency carriers with said data.

13. The receiving apparatus according to claim 12,
    wherein, when said pilot pattern has a distribution of said pilot signals in a time dimension, said channel estimator is configured to perform a channel estimation on the basis of said pilot pattern including additional pilot signals mapped on frequency carriers adjacent to said part of said transmission bandwidth that is not used to transmit signals with a time distribution corresponding to a time distribution of the pilot pattern.

14. The receiving apparatus according to claim 12,
    wherein said channel estimator is configured to perform a channel estimation on the basis of said pilot pattern including additional pilot signals mapped on every frequency carrier adjacent to said part of said transmission bandwidth that is not used to transmit signals in a time dimension.

15. The receiving apparatus according to claim 11,
    wherein frequency carriers with said pilot signals are arranged in at least one training pattern and frequency carriers with said data are arranged in a data pattern, wherein said channel estimator is configured to perform a channel estimation on the basis of said pilot pattern including additional pilot signals mapped on frequency carriers for said data symbols adjacent to said part of said transmission bandwidth that is not used to transmit signals.

16. The receiving apparatus according to claim 15, wherein, when said pilot pattern has a distribution of said pilot signals in a time dimension, said channel estimator is configured to perform a channel estimation on the basis of said pilot pattern including said additional pilot signals mapped on frequency carriers of said data pattern adjacent to said part of said transmission bandwidth that is not used to transmit signals with a time distribution corresponding to a time distribution of the pilot pattern.

17. The receiving apparatus according to claim 15, wherein said channel estimator is configured to perform a channel estimation on the basis of said pilot pattern including said additional pilot signals mapped on every frequency carrier for said data symbols adjacent to said part of said transmission bandwidth that is not used to transmit signals in a time dimension.

18. The receiving apparatus according to claim 11, wherein said channel estimator is configured to perform a channel estimation on the basis of pilot patterns that are changed depending on a presence of a part of said transmission bandwidth that is not used to transmit signals.

19. A receiving method for receiving signals in a multi-carrier system, in which pilot signals and data mapped on frequency carriers are transmitted in a transmission bandwidth, wherein a part of said transmission bandwidth is not used to transmit signals, the method comprising:
   performing a channel estimation on received signals on the basis of pilot signals arranged in a pilot pattern, and
   perform a channel estimation on the basis of a changed pilot pattern shifted in a frequency dimension so that a channel estimation for frequency carriers next to said part of said transmission bandwidth that is not used to transmit signals is possible, wherein the pilot pattern is shifted in the frequency dimension so that at least one of the pilot signals in the pilot pattern is located on a frequency carrier that is immediately adjacent to said part of the transmission bandwidth that is not used to transmit signals.

20. A system, comprising:
   a transmitting apparatus according to claim 1; and
   a receiving apparatus configured to receive signals transmitted from said transmitting apparatus, the receiving apparatus including a channel estimator configured to perform a channel estimation for the received signals on the basis of pilot signals arranged in a pilot pattern, a channel estimation for frequency carriers next to said part of said transmission bandwidth that is not used to transmit signals is possible.

21. A method for transmitting and receiving signals in a multi-carrier system, in which pilot signals and data mapped on frequency carriers are transmitted in a transmission bandwidth, wherein a part of said transmission bandwidth is not used to transmit signals, the method comprising:
   mapping pilot signals onto frequency carriers according to a pilot pattern that is adapted for a channel estimation on a receiving side;
   shifting the pilot pattern in the frequency dimension so that a channel estimation for frequency carriers next to said part of said transmission bandwidth is possible, wherein the shifting step comprises the pilot pattern in the frequency dimension so that at least one of the pilot signals in the pilot pattern is located on a frequency carrier that is immediately adjacent to said part of the transmission bandwidth that is not used to transmit signals;
   transmitting said signals; and
   receiving said signals according to the method of claim 19.

\* \* \* \* \*